United States Patent
Okamoto et al.

(10) Patent No.: US 6,528,926 B2
(45) Date of Patent: Mar. 4, 2003

(54) DRIVING APPARATUS

(75) Inventors: Yasuhiro Okamoto, Tondabayashi (JP); Ryuichi Yoshida, Sakai (JP); Akira Kosaka, Yao (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 10/001,428

(22) Filed: Oct. 30, 2001

(65) Prior Publication Data

US 2002/0084719 A1 Jul. 4, 2002

(30) Foreign Application Priority Data

Oct. 31, 2000 (JP) ........................................ 2000-332792

(51) Int. Cl.[7] ................................................ H02N 2/04
(52) U.S. Cl. ............................ 310/323.17; 310/323.02; 310/369
(58) Field of Search ........................ 310/323.01, 323.02, 310/323.03, 323.13, 323.17, 323.18, 328, 369

(56) References Cited

U.S. PATENT DOCUMENTS

| | | | | |
|---|---|---|---|---|
| 4,783,610 A | * | 11/1988 | Asano | ................... 101/93.48 |
| 5,589,723 A | | 12/1996 | Yoshida et al. | ............. 310/328 |
| 5,877,579 A | * | 3/1999 | Zumeris | ................ 310/323.17 |
| 5,905,327 A | * | 5/1999 | Ooi et al. | ............. 310/323.01 |
| 6,111,336 A | | 8/2000 | Yoshida et al. | ............. 310/328 |
| 6,201,340 B1 | * | 3/2001 | Matsuda et al. | ........ 310/323.02 |
| 6,384,514 B1 | * | 5/2002 | Slutskiy et al. | ............. 271/264 |
| 6,397,008 B2 | * | 5/2002 | Kuwana et al. | ........ 310/323.17 |
| 6,404,105 B1 | * | 6/2002 | Norbert | ................. 310/323.17 |

FOREIGN PATENT DOCUMENTS

| | | | | |
|---|---|---|---|---|
| JP | 63-262065 | * | 10/1988 | ................. 310/328 |
| JP | 2633066 B2 | | 3/1992 | ............ H02N/2/00 |
| JP | 06-123830 A | | 5/1994 | ............ G02B/7/04 |

* cited by examiner

*Primary Examiner*—Thomas M. Dougherty
(74) *Attorney, Agent, or Firm*—Sidley Austin Brown & Wood LLP

(57) ABSTRACT

A driving apparatus enjoying improved performance through the prevention of fluctuations in the driving characteristic, wherein a driven member, which is frictionally engaged with a driving member fixed to an electromechanical conversion element, is driven based on driving that is not symmetrical as to the timing of extension and contraction of the electromechanical conversion element, and wherein the electromechanical conversion element is elastically held by the housing.

12 Claims, 7 Drawing Sheets driving frequency/resonance frequency

DRIVING APPARATUS

This application is based on application No. JP2000-332792 filed in Japan, the contents of which is hereby incorporated by reference.

BACKGROUND OF THE INVENTION

1. Field of the Invention

This invention relates to an improved driving apparatus, and more particularly relates to a driving apparatus using an improved electromechanical conversion element.

2. Description of the Related Art

There have hitherto been proposed various types of driving apparatuses using as the driving source electromechanical conversion elements formed of a piezoelectric, electrostrictive or magnetostrictive material.

For example, as shown in the simplified illustration of FIG. 1(a), a driving apparatus has been proposed in which a driving member S is fixed to one lengthwise end of a piezoelectric element M while the other lengthwise end is fixed to a fixing member B, such that a driven member A is frictionally engaged with the driving member S.

Using a driving apparatus of this type, as shown in FIG. 1(b) for example, when the piezoelectric element M slowly extends, the driving member S and driven member A move together due to the frictional force therebetween. In other words, in FIG. 1(d) in which the horizontal axis represents the time T and the vertical axis represents the displacement Y, the displacement L1 of the piezoelectric element M over time and the displacement K1 of the driven member A over time roughly match each other.

On the other hand, where the piezoelectric element M rapidly contracts as shown in FIG. 1(c), slipping occurs between the driving member S and the driven member A, resulting in movement of the driving member S only with the driven member A being stationary. In other words, in FIG. 1(d), in contrast with the displacement L2 of the piezoelectric element M over time, there is little change in the displacement K2 of the driven member A over time.

When this basic operation principle is repeatedly applied, the driven member A may be moved in a relative fashion in a desired direction along the driving member S.

A specific example of such a driving apparatus is shown in the perspective view of FIG. 2 illustrating the components thereof in a disassembled fashion.

Using the driving apparatus 5, basically, a driven member 8 and a driving member 6 are housed in one space 9a of a housing 9 while a piezoelectric element 7 is housed in another space 9b thereof. One lengthwise end of the piezoelectric element 7 is bonded to an end of the driving member 6, and the other lengthwise end of the piezoelectric element 7 is bonded to the housing 9. The driving member 6 passes through and is held inside pierced holes 9s and 9t formed in the housing 9. A driven member 8 has a slider 8d through which the driving member 6 passes, a friction member 8c that is pressurized by the driving member 6 in the slider, and a plate spring 8b that is fixed to the slider 8d at both ends thereof using screws 8a and the middle portion of which presses down the friction member 8c.

Incidentally, the conventional driving apparatus described above has the following characteristics.

FIG. 3 shows the driving characteristic obtained when a driving voltage having rectangular waves with a 0.3 duty ratio is impressed to the piezoelectric element 7 of this driving apparatus 5. The vertical axis represents the moving speed of the driven member 8. The horizontal axis represents the driving frequency of the driving voltage which was standardized (rendered dimensionless) by dividing it by the resonance frequency of the piezoelectric element 7, and the graph shows the results of measurement taken in the range between 0.6 and 0.9. As shown in the graph, the driven member 8 generally tends to move faster as the driving frequency increases.

However, the characteristic curve fluctuates dramatically up and down, and large drops in moving speed are also seen, indicating substantial fluctuation in the driving characteristic. Substantial fluctuation in the driving characteristic as in this example leads to a reduction in the performance of the apparatus.

Therefore, in order to ensure efficient driving and a stable driving speed, the driving frequency must be strictly controlled so that driving frequencies that would cause a drop in speed can be avoided. In addition, if there are large variations in the driving characteristic among driving apparatuses 5 having the same construction, a special adjustment will be required, such as checking for and setting the optimal control parameters for each of the driving apparatuses 5.

OBJECTS AND SUMMARY

The present invention was created in view of the above situation, and an object thereof is to provide an improved driving apparatus. More particularly, an object of the present invention is to provide a driving apparatus having improved performance through the prevention of fluctuations in the driving characteristic.

In order to attain these and other objects, the driving apparatus according to one aspect of the present invention includes an electromechanical conversion element, a driving member that is fixed to one lengthwise end of the electromechanical conversion element, a driven member that is engaged with the driving member using a prescribed frictional force, a platform that is fixed to the other lengthwise end of the electromechanical conversion element, a housing that holds the platform, and a driver that impresses to the electromechanical conversion element a driving voltage by which to move the driven member, wherein the platform is elastically held relative to the housing.

Based on the above construction, when a driving voltage having an appropriate waveform is impressed to the electromechanical conversion element, the electromechanical conversion element extends and contracts. The oscillation caused by such extension and contraction is transmitted to the driving member, such that the driven member, which is engaged with the driving member using a prescribed frictional force, moves relative to the electromechanical conversion element.

When this occurs, it may seem that both the driving member and the platform oscillate due to the extension and contraction of the electromechanical conversion element. However, because the platform is elastically held by the housing, the transmission of the oscillation is reduced or blocked between the platform and the housing. Consequently, the housing may be prevented from resonating based on the oscillation, which is caused by the extension and contraction of the electromechanical conversion element being transmitted from the platform to the housing. Furthermore, even if the housing resonates, the transmission of such oscillation from the housing to the platform may be reduced or blocked. In other words, the drops in speed at specific frequencies that may have been caused by the characteristic oscillation of the housing, which was present in the prior art, may be prevented, and as a result, fluctuations in the driving characteristic may be prevented and the performance of the apparatus may be improved.

Specifically, the present invention may be realized using various forms as described below.

In the driving apparatus according to another aspect of the invention, the platform is bonded to the housing using an elastic adhesive agent.

If an elastic adhesive agent (such as a rubber adhesive agent, urethane adhesive agent, silicone adhesive agent, elastic epoxy adhesive agent or the like) is used, the platform may be elastically held by the housing using a simple construction, which enables easy manufacture and assembly of the apparatus.

According to another aspect of the invention, the platform is held by the housing via a spring member.

Based on this construction, if an appropriate material and shape are selected for the spring member, a prescribed spring coefficient may be obtained with ease and accuracy. Therefore, it is easy to ensure that the platform is elastically held by the housing in the desired condition.

According to another aspect of the invention, the platform has an essentially cylindrical configuration, and is aligned such that the central axis thereof matches the longitudinal central axis of the electromechanical conversion element along which it extends and contracts.

Based on this construction, because the platform is made symmetrical relative to an axis, oscillation in an unnecessary oscillation mode, i.e., in the directions perpendicular to the directions in which the electromechanical conversion element extends and contracts, for example, may be prevented to the extent possible. Therefore, fluctuations in the driving characteristic may be further prevented. In addition, because the platform has a configuration that is symmetrical relative to the central axis thereof, and is aligned such that this axis matches the axis of the electromechanical conversion element, it becomes no longer necessary to adjust the angle of the platform to the electromechanical conversion element, making assembly of the apparatus easy.

Furthermore, according to another aspect of the invention, the platform has an outer circumferential surface in which protrusions and indentations are formed.

Based on this construction, the surface area of the outer circumference of the platform is increased due to these protrusions and indentations. Consequently, the amount of heat released from the platform increases. Therefore, the heat generated by the electromechanical conversion element may be efficiently released from the platform, enabling an increase in the temperature of the electromechanical conversion element to be prevented.

In addition, according to another aspect of the invention, the electromechanical conversion element has an essentially cylindrical configuration.

Based on this construction, because the electromechanical conversion element has a configuration that is symmetrical relative to an axis, oscillation in an unnecessary oscillation mode, i.e., in the directions perpendicular to the central axis of the electromechanical conversion element along which it extends and contracts, for example, may be prevented to the extent possible. Therefore, fluctuations in the driving characteristic may be further prevented. In addition, where the electromechanical conversion element is aligned such that the axis thereof matches the axes of the driving member and platform, it becomes no longer necessary to adjust the angle of the electromechanical conversion element to the driving member and platform, making assembly of the apparatus easy.

Moreover, according to another aspect of the invention, the driving member comprises a rod member having a circular cross-section, and is aligned such that the central axis thereof matches the longitudinal central axis of the electromechanical conversion element along which it extends and contracts.

Based on this construction, because the driving member has a symmetrical configuration relative to an axis, oscillation in an unnecessary oscillation mode, i.e., in the directions perpendicular to the directions in which the electromechanical conversion element extends and contracts, for example, may be prevented to the extent possible. Therefore, fluctuations in the driving characteristic can be further prevented. In addition, because the driving member has a configuration that is symmetrical relative to a central axis thereof and is aligned such that this axis matches the axis of the electromechanical conversion element, it becomes no longer necessary to adjust the angle of the driving member to the electromechanical conversion element, making assembly of the apparatus easy.

Furthermore, according to another aspect of the invention, the electromechanical conversion element is directly elastically held by the housing.

Based on this construction, the platform may be eliminated, which makes the construction and assembly of the apparatus simple.

BRIEF DESCRIPTION OF THE DRAWINGS

These and other objects and features of the present invention will become apparent from the following description of preferred embodiments thereof taken in conjunction with the accompanying drawings, in which.

In the following description, like parts are designated by like reference numbers throughout the several drawings.

DETAILED DESCRIPTION OF THE PREFERRED EMBODIMENTS

The driving apparatus pertaining to each embodiment of the present invention will be described below with reference to the accompanying drawings.

A driving apparatus 1 of the first embodiment will first be described with reference to FIG. 4.

Figure 4A:
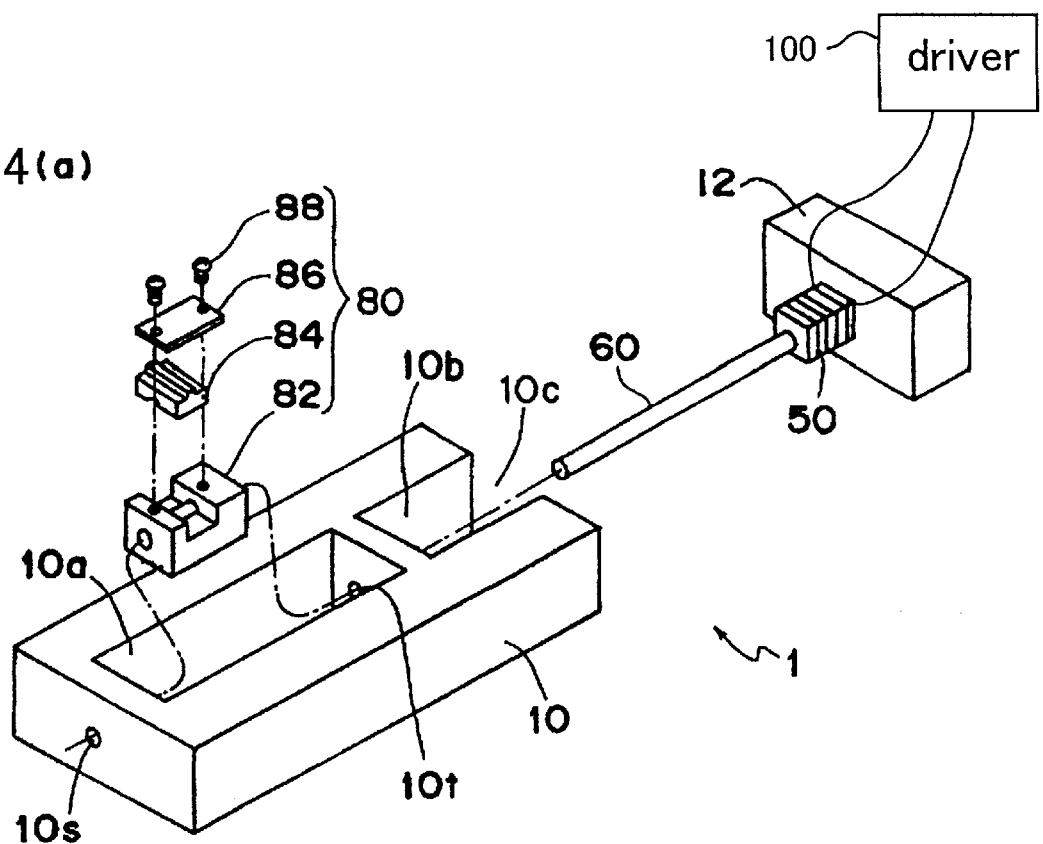
FIGS. 4a, 4b and 4c contain a perspective view of the driving apparatus pertaining to a first embodiment of the present invention showing the components thereof in a disassembled fashion, as well as plan views of the important components thereof.
Figure 4B:
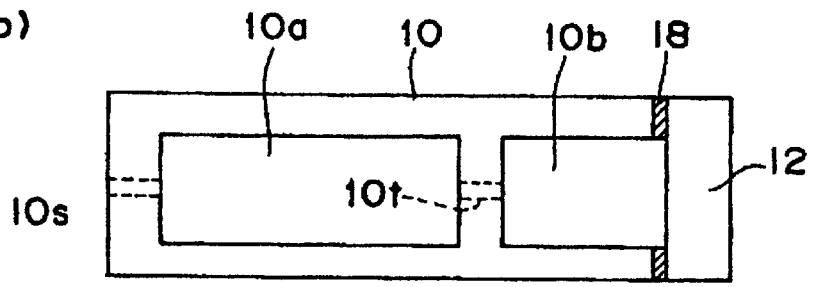

FIG. 4(a) is a perspective view of the driving apparatus 1, showing the components thereof in a disassembled fashion. The housing 10 essentially has a space 10a in which a driving member 60 and a driven member 80 are housed and the cross-section of which is of a squarish rectangular configuration, and a space 10b in which a piezoelectric element 50 is housed and the cross-section of which has the configuration of a squared letter C. An opening 10c, which opens into the space 10b having a cross-section of a squared letter C configuration, is formed at one end of the housing 10. This opening 10c may be closed up with a platform 12, as shown in FIG. 4(b). In other words, the platform 12 is bonded to one end of the housing 10 using an elastic adhesive agent 18. For this adhesive agent, a synthetic rubber adhesive agent, such as Three Bond 1521B , for example, is used. The adhesive agent 18 is applied such that it forms an approximately 0.5 mm-thick adhesive layer and the platform 12 is elastically held by the housing 10.

Figure 4C:
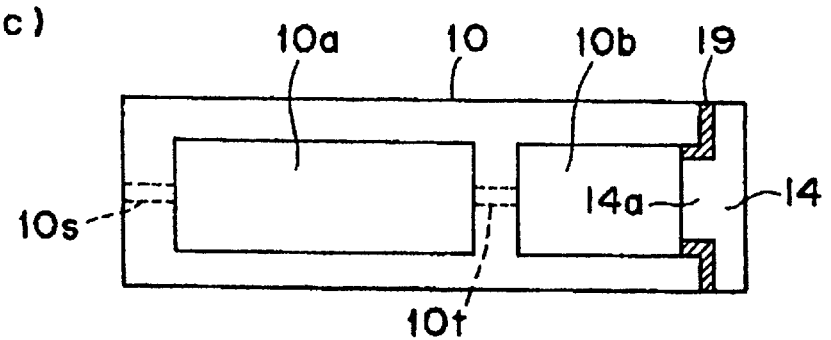

A convex area 14a may be formed on the platform 14 such that it engages with the opening 10b of the housing 10, and the platform 14 is similarly elastically held by the housing 10 via an elastic adhesive agent 19, as shown in FIG. 4(c).

The piezoelectric element 50 is bonded at one lengthwise end to one end of the driving member 60, as well as to the platform 12 at the other lengthwise end. The piezoelectric element 50, driving member 60 and platform 12 strongly adhere to each other and become integrated as a single unit. An epoxy adhesive agent, for example, is used for this bonding, and is cured through heating to approximately 150° C.

The driving member 60 is placed through the pierced holes 10s and 10t of the housing 10 and held therein. The driven member 80 frictionally engages with the driving member 60. In other words, the driven member 80 has a slider 82 through which the driving member 60 passes, a friction member 84 that is pressurized by the driving member 60 placed in the slider 82, and a plate spring 86 that presses down the friction member 84. The plate spring 86 is fixed at both ends thereof onto the slider 82 using such things as screws 88.

The driving apparatus 1 includes a driver 100, and impresses a driving voltage that has an appropriate waveform, such as a saw-tooth or rectangular waveform, to the piezoelectric element 50. As a result, the piezoelectric element 50 extends and contracts, causing the driving member 60 to oscillate, thereby causing the driven member 80 to move along the driving member 60.

Figure 5:
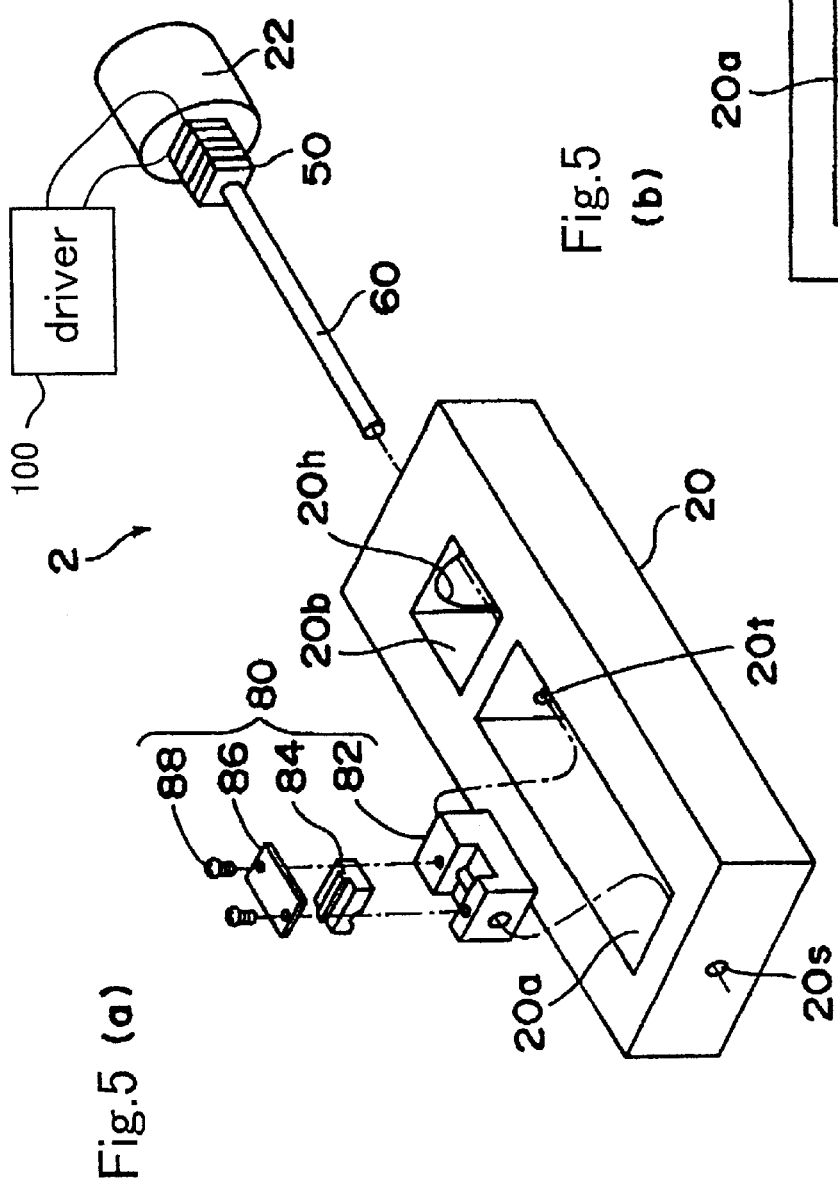
FIGS. 5a and 5b contain a perspective view of the driving apparatus pertaining to a second embodiment of the present invention showing the components thereof in a disassembled fashion, as well as plan views of the important components thereof.

The driving apparatus 2 pertaining to a second embodiment will be described below with reference to FIG. 5. Because the driving apparatus 2 has essentially the same construction as the driving apparatus 1 of the first embodiment, the following description is provided focusing on the differences therefrom.

As for the housing 20, not only the space 20a in which the driving member 60 and driven member 80 are housed, but also the space 20b in which the piezoelectric element 50 is housed, have a squarish rectangular cross-section. A round hole 20h is formed in one end of the housing 20, which connects the space 20b with the outside. A cylindrical platform 22 is bonded to the piezoelectric element 50.

As shown in FIG. 5(b), the platform 22 is passed through the round hole 20h of the housing 20. An approximately 0.5 mm uniform gap is formed between the exterior circumference of the platform 22 and the interior circumference of the round hole 20h, such that it may be filled with an elastic adhesive agent 28.

Figure 1:
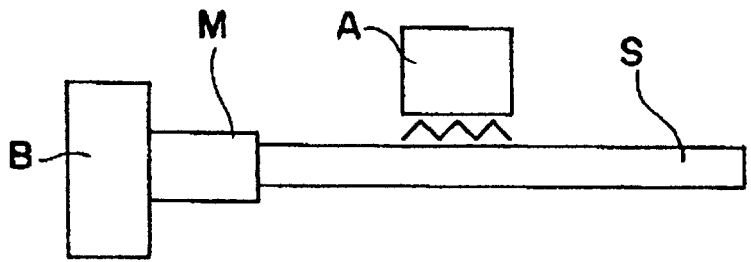
FIGS. 1a, 1b, 1c, and 1d are illustrations to explain the principle of a conventional driving apparatus.
Figure 1:
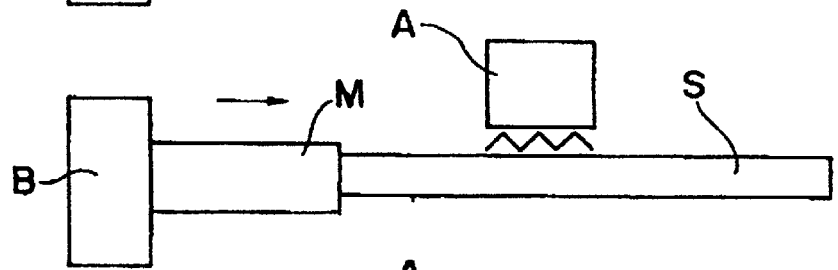
Figure 1:
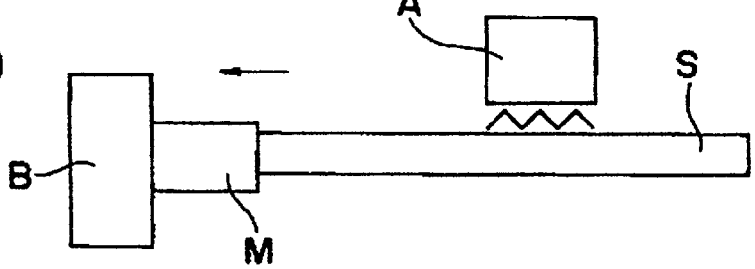
Figure 1:
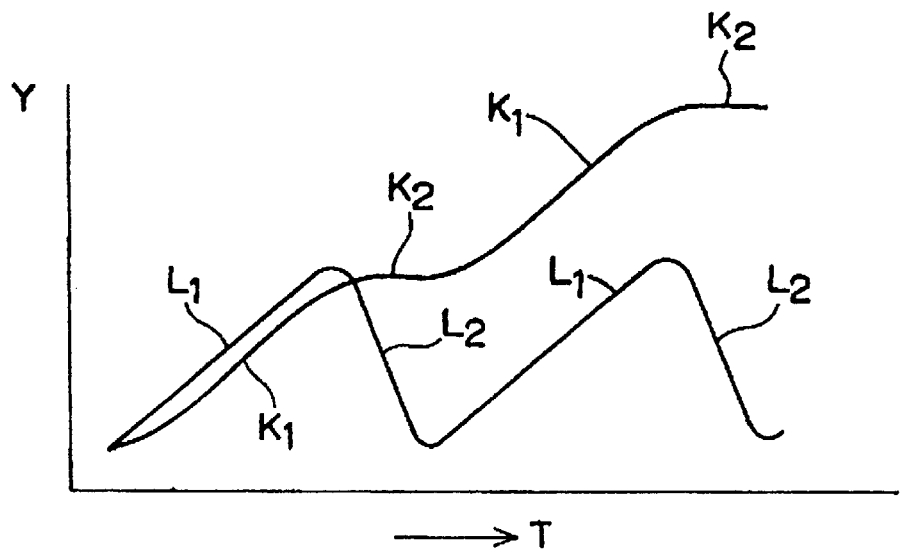
Figure 2:
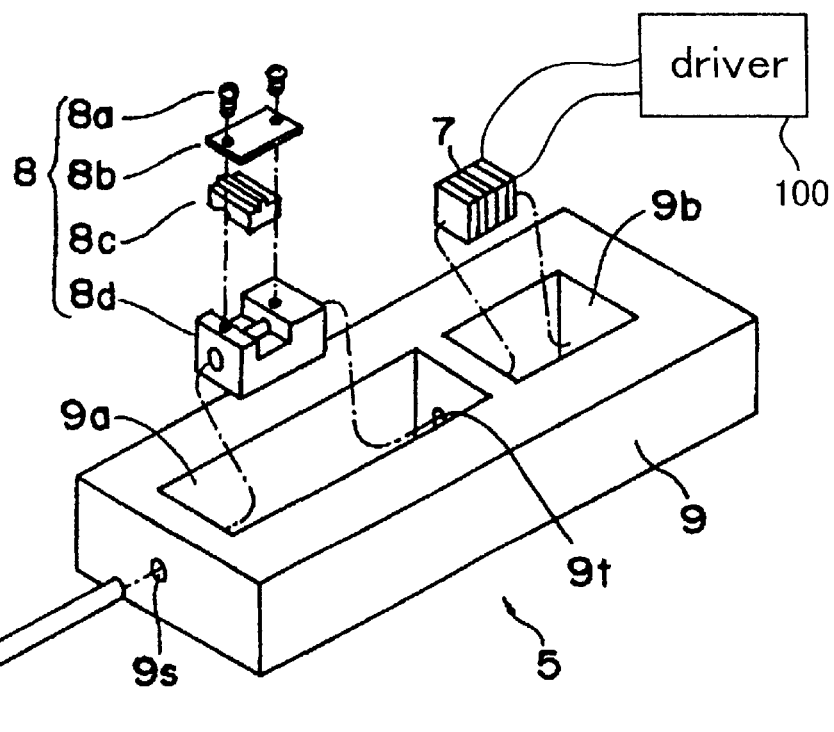
FIG. 2 is a perspective view showing the components of the conventional driving apparatus in a disassembled fashion.
Figure 3:
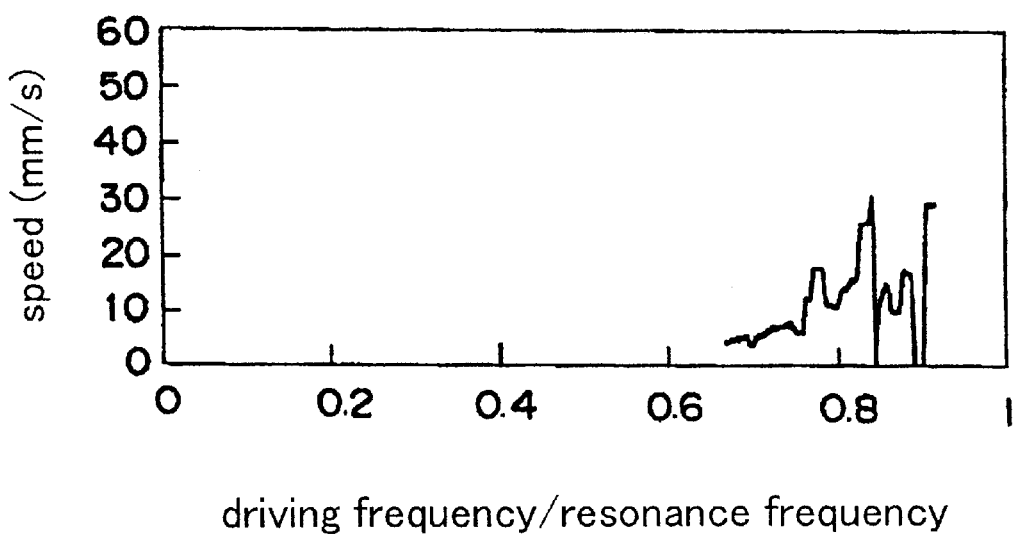
FIG. 3 is a graph showing the driving characteristic of the conventional driving apparatus.
Figure 8:
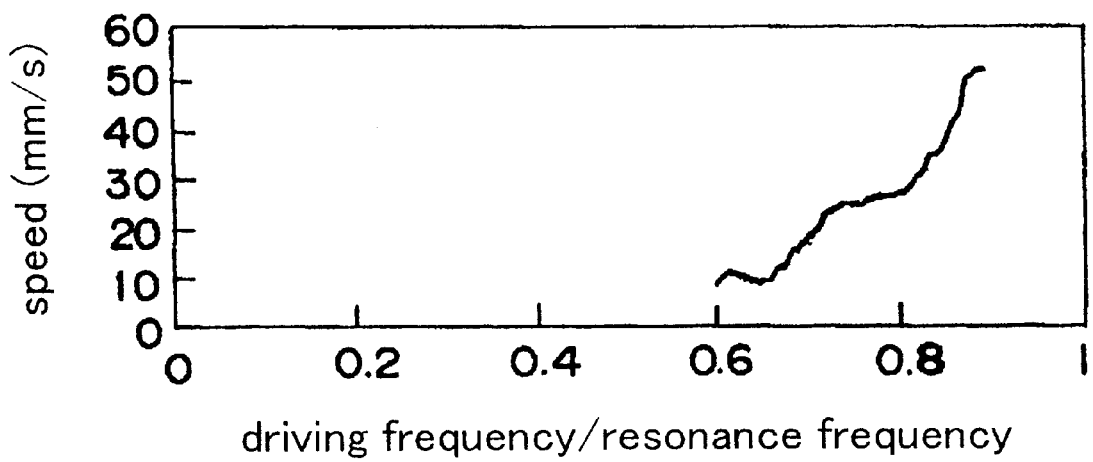
FIG. 8 is a graph showing the driving characteristic of the driving apparatus shown in FIG. 5.

FIG. 8 shows a graph of the driving characteristic of the driving apparatus 2. The horizontal and vertical axes represent the same elements as those in FIG. 3 illustrating the prior art. The driving characteristic of the driving apparatus 2 is as shown in FIG. 8, indicating that there is little fluctuation in the characteristic curve and few drops in speed, and in comparison with the apparatus of the prior art shown in FIG. 3, it is appreciated that there is less fluctuation in the driving characteristic, representing improved apparatus performance.

Figure 6:
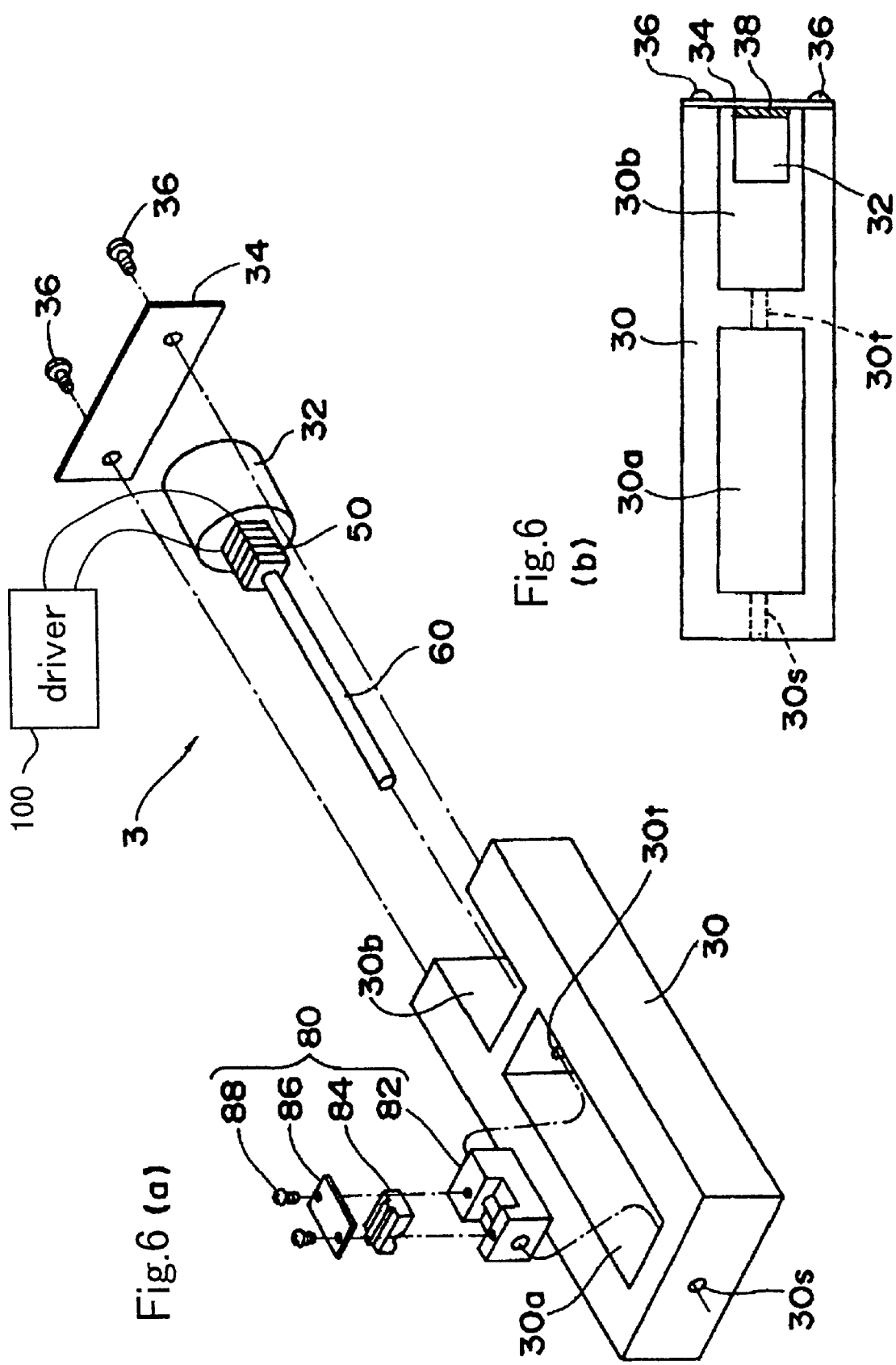
FIGS. 6a and 6b contain a perspective view of the driving apparatus pertaining to a third embodiment of the present invention showing the components thereof in a disassembled fashion, as well as plan views of the important components thereof.

The driving apparatus 3 pertaining to a third embodiment will now be described with reference to FIG. 6. Because the driving apparatus 3 has essentially the same construction as the driving apparatus 1 of the first embodiment, the following description is provided focusing on the differences therefrom.

The housing 30 has, like the driving apparatus 1 of the first embodiment, a space 30a in which a driving member 60 and a driven member 80 are housed and which has a squarish rectangular cross-section, and a space 30b in which a piezoelectric element 50 is housed and which has a squared letter C cross-section. Unlike the driving apparatus 1 of the first embodiment, however, the piezoelectric element 50 is bonded at one lengthwise end to one end of a cylindrical platform 32. A plate spring 34 is bonded to the other end of the platform. As shown in FIG. 6(b), the plate spring 34 is fixed to an end surface of the housing 30 using screws 36, such that the platform 12 is housed inside the space 30b of the housing 30. For the adhesive agent 38 used between the platform 32 and the plate spring 34, an elastic adhesive agent such as a synthetic rubber adhesive agent or an elastic agent that has little elasticity or no elasticity, such as an epoxy adhesive agent, may be used.

In order to assemble the driving apparatus 3, the driving member 60, piezoelectric element 50, platform 32 and plate spring 34 are mutually bonded together to create a single unit, the driving member 60 is passed through the pierced holes 30s and 30t of the housing 30, and the whole unit is fixed to the housing 30 using screws 36 while making adjustments. Therefore, the driving apparatus may be easily manufactured and assembled.

A specific example of the driving apparatus 3 is shown below.

The housing 30 has exterior dimensions of 3×6×12 mm, and is made of material SUS430. The driving member 60 is 1 mm in diameter and 8 mm in length, and is made of carbon. The piezoelectric element 50 comprises layers and has dimensions of 1.2×1.2×2.5 mm. It is made of soft PZT [Pb(Zr, Ti) $O_3$]. The platform 32 is 2 mm in diameter and 1.5 mm in length, and is made of tungsten. The frictional force between the driven member 80 and the driving member 60 is $2 \times 10^{-3}$N. A rectangular wave voltage having a voltage Vp-p of 6V, a driving frequency of 120 kHz to 180 kHz, and a duty ratio of 0.35 or 0.65 (depending on the direction of driving) is impressed to the piezoelectric element 50. The primary resonance frequency in the system is 200 kHz.

The mass of the platform 32 is made sufficiently larger than the mass of the driving member 60 so that the extension and contraction of the piezoelectric element 50 may be used to the extent possible to cause displacement of the driving member 60 for increased driving efficiency. In addition, the characteristic frequency between the platform 32 and the housing 30 is less than $\frac{1}{10}$ of the driving frequency. For example, the characteristic frequency between the platform 32 and the housing 30 is approximately $\frac{1}{100}$ to $\frac{1}{1000}$ of the driving frequency, and the cut-off frequency is approximately 40–500 Hz.

Figure 7:
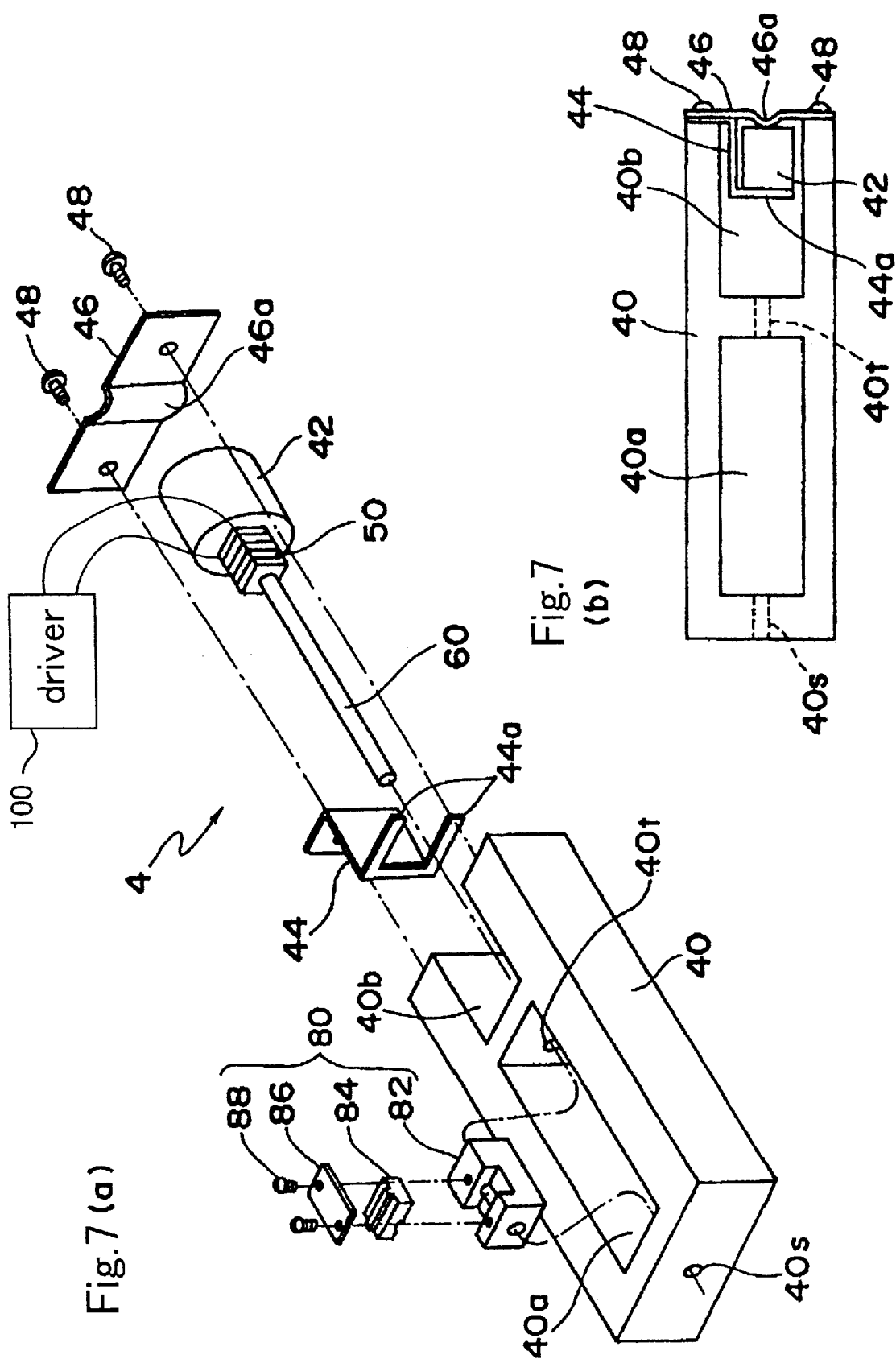
FIGS. 7a and 7b contain a perspective view of the driving apparatus pertaining to a fourth embodiment of the present invention showing the components thereof in a disassembled fashion, as well as plan views of the important components thereof.

The driving apparatus 4 pertaining to a fourth embodiment will now be described with reference to FIG. 7. Because the driving apparatus 4 essentially has the same construction as the driving apparatus 3 of the third embodiment, the following description is provided focusing on differences therefrom.

The housing 40 has, like the driving apparatus 3 of the third embodiment, a space 40a in which a driving member 60 and a driven member 80 are housed and which has a squarish rectangular cross-section, and a space 40b in which a piezoelectric element 50 is housed and which has a squared letter C cross-section. One lengthwise end of the piezoelectric element 50 is bonded to one end of a cylindrical platform 42.

Unlike the driving apparatus 3 of the third embodiment, however, as shown in FIG. 7(b), the platform 42 is held at either end thereof between a pressing piece 44a of a first plate spring 44 and a protrusion 46a of a second plate spring 46. The plate springs 44 and 46 are fixed to an end surface of the housing 40 using screws 48, such that the platform 42 is housed inside the space 40b of the housing 40.

In the driving apparatuses 1 through 4 described above, a platform is bonded to a piezoelectric element and the platform and a housing are elastically combined, resulting in the formation of an area between the platform and the housing that functions as a lowpass filter which reduces or blocks the transmission of oscillation to the housing. Consequently, the housing is prevented from resonating in an unnecessary oscillation mode and from adversely affecting the driving characteristic.

Therefore, fluctuations in the driving characteristic may be prevented and the performance of the driving apparatus may be improved.

The present invention is not limited to the above embodiments, and may be implemented in various other forms.

Figure 9:
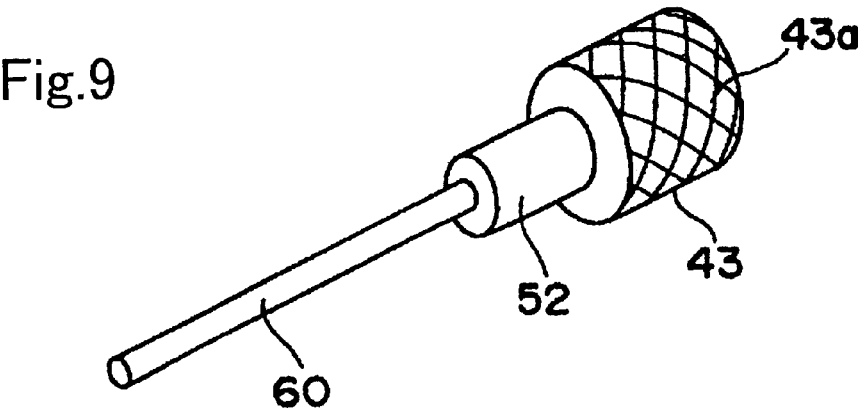
FIG. 9 is a perspective view of a modified example showing the important components thereof.

For example, as illustrated in the perspective view of the important components of FIG. 9, a driving member 60, a piezoelectric element 52 and a platform 43 that are each symmetrical relative to their respective longitudinal axes, and are placed such that their axes match, may be used. Through the use of such components, the occurrence of an unnecessary oscillation mode is prevented to the extent possible, and the performance of the driving apparatus may be further improved.

In addition, as shown in FIG. 9, the surface area of the platform 43 may be increased through the creation of an uneven surface such as a knurl 43a on the outer circumference of the platform 43. As a result, the heat generated by the piezoelectric element 52 may be efficiently released from the outer circumference of the platform 43.

Furthermore, the platform, the housing and the part that connects the platform and the housing may be molded as an integrated unit using a single material. In this case, the part that connects the platform and the housing should be formed such that it is more susceptible to elastic deformation by reducing the cross-sectional area thereof, for example.

The platform and the housing may also be formed as an integrated unit, and the platform and the piezoelectric element may be connected using an elastic member. Alternatively, the platform may be eliminated, such that the housing and the piezoelectric element are directly connected using an elastic member.

Furthermore, it suffices if the oscillation from the piezoelectric element is transmitted to the driving member so that it can drive the driven member. Therefore, the driving member may be slidably held by the housing, or elastically held by the housing using an elastic adhesive agent, or strongly bonded to the housing via welding or the like. Moreover, the driving member may be fixed to the piezoelectric element only, such that it is held at one end only without being held by the housing at the other end, or it may be held by a different member than the housing. Alternatively, the driving member may be elastically held by the housing using a spring or the like with the platform not being in contact with the housing.

Although the present invention has been fully described by way of examples with reference to the accompanying drawings, it is to be noted that various changes and modifications will be apparent to those skilled in the art. Therefore, unless such changes and modification depart from the scope of the present invention, they should be construed as being included therein.

What is claimed is:

1. A driving apparatus comprising:
   an electromechanical conversion element;
   a driving member that is fixed to a first lengthwise end of the electromechanical conversion element;
   a driven member that is engaged with the driving member using a prescribed frictional force;
   a platform that is fixed to a second lengthwise end of the electromechanical conversion element;
   a housing that holds the platform; and
   a driver that impresses to the electromechanical conversion element a driving voltage by which to move the driven member along the driving member, wherein the platform is elastically held relative to the housing.

2. A driving apparatus according to claim 1, wherein the platform is bonded to the housing using an elastic adhesive agent.

3. A driving apparatus according to claim 1, wherein the platform is held by the housing via a spring member.

4. A driving apparatus according to claim 1,
   wherein the platform has an essentially cylindrical configuration, and is aligned such that the central axis thereof matches the longitudinal central axis of the electromechanical conversion element along which it extends and contracts.

5. A driving apparatus according to claim 1,
   wherein the electromechanical conversion element has an essentially cylindrical configuration.

6. A driving apparatus comprising:
   an electromechanical conversion element;
   a driving member that is fixed to a first lengthwise end of the electromechanical conversion element;
   a driven member that is engaged with the driving member using a prescribed frictional force;
   a platform that is fixed to a second lengthwise end of the electromechanical conversion element;
   a housing that holds the platform; and
   a driver that impresses to the electromechanical conversion element a driving voltage by which to move the driven member, wherein the platform is elastically held relative to the housing, and wherein the platform has an outer circumferential surface in which protrusions and indentations are formed.

7. A driving apparatus comprising:

an electromechanical conversion element;

a driving member that is fixed to a first lengthwise end of the electromechanical conversion element;

a driven member that is engaged with the driving member using a prescribed frictional force;

a platform that is fixed to a second lengthwise end of the electromechanical conversion element;

a housing that holds the platform; and a driver that impresses to the electromechanical conversion element a driving voltage by which to move the driven member, wherein the platform is elastically held relative to the housing, and wherein the driving member comprises a rod member having a circular cross-section, and is aligned such that the central axis thereof matches the longitudinal central axis of the electromechanical conversion element along which it extends and contracts.

8. A driving apparatus comprising:

an electromechanical conversion element;

a driving member that is fixed to a first lengthwise end of the electromechanical conversion element;

a driven member that is engaged with the driving member using a prescribed frictional force;

a housing that holds a second lengthwise end of the electromechanical conversion element; and a driver that impresses to the electromechanical conversion element a driving voltage by which to move the driven member along the driving member, wherein the second lengthwise end of the electromechanical conversion element is elastically held relative to the housing.

9. A driving apparatus according to claim 8, wherein the second lengthwise end of the electromechanical conversion element is bonded to the housing using an elastic adhesive agent.

10. A driving apparatus according to claim 8, wherein the second lengthwise end of the electromechanical conversion element is held by the housing via a spring member.

11. A driving apparatus according to claim 8, wherein the electromechanical conversion element has an essentially cylindrical configuration.

12. A driving apparatus comprising:

an electromechanical conversion element;

a driving member that is fixed to a first lengthwise end of the electromechanical conversion element;

a driven member that is engaged with the driving member using a prescribed frictional force;

a housing that holds a second lengthwise end of the electromechanical conversion element; and a driver that impresses to the electromechanical conversion element a driving voltage by which to move the driven member, wherein the second lengthwise end of the electromechanical conversion element is elastically held relative to the housing, and wherein the driving member comprises a rod member having a circular cross-section, and is aligned such that the central axis thereof matches the longitudinal central axis of the electromechanical conversion element along which it extends and contracts.

* * * * *